United States Patent

[11] 3,571,500

[72] Inventor Ernie G. Nassimbene
San Jose, Calif.

[21] Appl. No. 697,846
[22] Filed Jan. 15, 1968
[45] Patented Mar. 16, 1971
[73] Assignee International Business Machines Corporation
Armonk, N.Y.
Continuation-in-part of application Ser. No. 653,782, July 17, 1967, now abandoned.

[54] REPRODUCTION SYSTEM USING AN INCREMENTAL SCAN

12 Claims, 8 Drawing Figs.

[52] U.S. Cl. .......... 178/6.6, 179/100.2
[51] Int. Cl. .......... G11b 3/40, H04n 1/16, H04n 5/78
[50] Field of Search .......... 179/100.2 (T); 340/174.1 (M); 178/6.6 (A); 226/(Inquired); 178/6.6 (A); 179/100.2

[56] References Cited

UNITED STATES PATENTS 3,376,395 4/1968 Rumple .......... 178/6.6X
3,395,385 7/1968 Scoville .......... 179/100.2X

*Primary Examiner*—James W. Moffitt
*Assistant Examiner*—Steven B. Pokotilow
*Attorneys*—Hanifin and Jancin and Vincent W. Cleary ABSTRACT: A video recorder wherein the magnetic tape is helically wound about a drum with the drum containing a magnetic record and playback head for recording and playing back video information on angularly disposed tracks on the video tape. The magnetic head scans a first semicircular portion of the tape while this portion of the tape is being held fixed by two vacuum brakes positioned at both ends of the semicircular portion. While the head is so scanning this first portion of the tape, pneumatic brakes at either end of the second semicircular portion of the tape are not actuated and this portion of the tape is moved longitudinally removing a slack portion between the first and second portions. As the head approaches the second portion of the tape, two vacuum brakes at either end of this portion are actuated so as to fix the second portion of the tape. While the magnetic head is scanning the second semicircular portion of the video tape, the two brakes at either end of the first semicircular portion are deactivated and this portion is moved longitudinally the distance between two tracks. The cycle then repeats and the head scans the next track.

INVENTOR
ERNIE G. NASSIMBENE
BY [signature]
Attorney

REPRODUCTION SYSTEM USING AN INCREMENTAL SCAN

CROSS-REFERENCE TO RELATED APPLICATIONS

This patent application is a continuation in part of U.S. Pat. application Ser. No. 653,782 filed Jul. 17, 1967 now abandoned in the name of Ernie G. Nassimbene, entitled "Video Recording Technique."

BACKGROUND OF THE INVENTION

1. Field of the Invention

The invention pertains to a recording and reproducing system utilizing magnetic tape helically wound about a rotating drum.

2. Description of the Prior Art

Some conventional video-recording and reproducing systems utilize a magnetic tape that is helically wound about a rotating drum with the magnetic tape continually moving about the drum while the drum is continually rotating. The drum contains a recording and reproducing magnetic head which comes into magnetic contact with the magnetic tape so as to both record and reproduce video information on the tape. When it is desired to repeat a single frame or project a "-still" picture, the tape is stopped and the rotating head rescans the same track as previously scanned. In such still projection, the tape is now fixed with the head continually rotating. Consequently, the rotating head path and the prerecorded path on the tape will not line up throughout the distance of the track and thus only a compromise image is possible. Such misalignment is also realized, and for this same reason, when it is desired to playback at a slower speed than the recording speed by repeating frames by holding the tape fixed for more than one rotation of the head.

SUMMARY OF THE INVENTION

It is therefore an object of the invention to provide an improved method and apparatus for recording and playing back transversely recorded magnetic tape records.

A further object of the invention is the provision of a new and improved recording and reproducing method and apparatus for recording and reproducing a video signal on a helically disposed magnetic tape at various speeds so as to enable accurate reproduction of the recorded video signal at a speed different than the recording speed.

A still further object of the invention is to provide a new and improved method and apparatus for accurately playing back transversely recorded video signals either at an average speed less than the recorded speed or with a still or stop picture projection.

The above objects of the present invention are accomplished by a method and apparatus for recording and reproducing video signals which includes a video magnetic tape helically wound about a drum. The drum includes a rotating, recording and reproducing magnetic head. This head records and/or reproduces video signals in tracks on the tape while at least that portion of the tape adjacent the head is fixed rather than moving. The tape or at least a portion of the tape is incremented longitudinally while out of magnetic transfer relationship with the magnetic head. Thus, any recording or reproducing of a track signal occurs only while the tape track is fixed and the magnetic head is rotating. Consequently, upon reproduction, still picture projection (by repeating the same scan), the tape track and the head are in the same relationship or position as they were when the track signal was recorded. Since the head and the track are in the same position as during recording, that is, movable head-fixed tape on the rescan, the head will be in accurate alignment with the track during this rescan, stop-frame or still picture projection. Thus, a high quality stop action or slow motion projection results.

In the present invention during playback, the input capstan applies a linear velocity to the tape that is greater than the velocity applied to the tape by the output capstan. In addition, the audio head is located adjacent to the output capstan. In order to insure constant velocity to this audio head despite variations in tape speed in the remainder of the system, the input tape speed is made greater than the output longitudinal tape speed and the above cavity and detector means prevents accumulation of the tape at the output capstan by repeating a video frame without visibly affecting the picture emanating from video tracks.

DESCRIPTION OF THE PREFERRED EMBODIMENT

Figure 1:
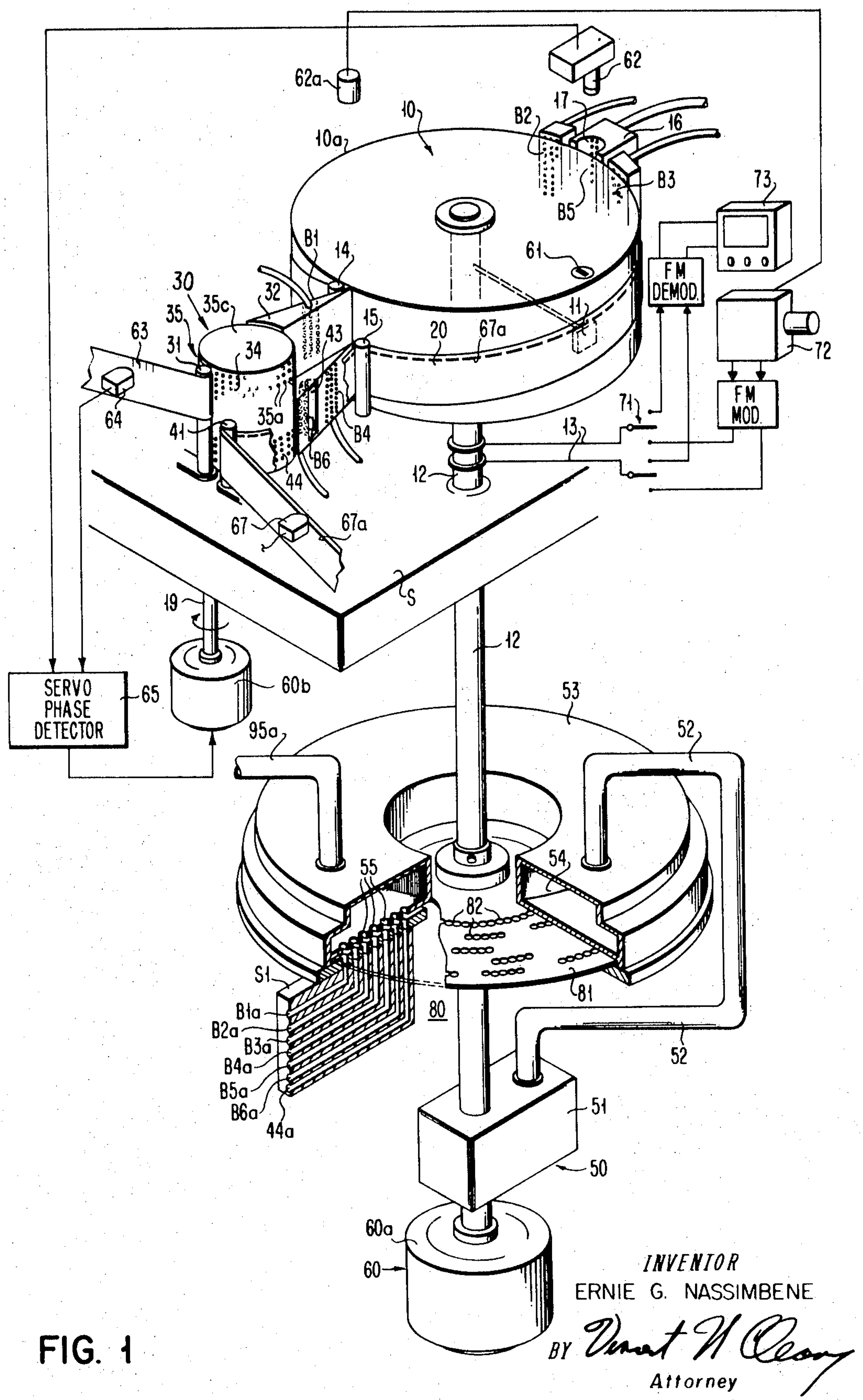
FIG. 1 is an isometric view partially in cross section of the video recorder embodying the invention.

In the embodiment of the invention shown in FIG. 1, a tape 20 is helically wound about a drum **10*a* of a drum assembly 10. The drum assembly includes a magnetic recording and reproducing head 11 for recording and reproducing angularly disposed tracks on the tape 20. The tape 20 is threaded off a supply reel R1 (as seen in FIGS. 3—6 past an upper input capstan assembly 30 then helically disposed about the drum 10*a* past a lower output capstan assembly 40** and onto a takeup reel R2.

During a first portion of the cycle of recording or reproducing, a first semicircular portion 22 of the tape 20 is held fixed by brakes B3 and B4. While the first portion 22 is held fixed, the head 11 scans that portion 22. While the head 11 is so scanning the tape portion 22, a slack portion 23 is being formed by advancing a second semicircular portion 21. During the second half of the cycle, the second tape portion 21 is held fixed by brakes B1 and B2 while the head 11 scans portion 21. During this scanning, brakes B3 and B4 are deactivated, portion 22 is incremented forward so that slack portion 23 is pulled taut. The cycle is then repeated. As can be seen by this operation, the scanning of the tape by the head 11 occurs only while the tape being scanned is fixed. This is contrary to existing video tape recorders wherein the tape is continuously moving while the head is moving. Consequently, with repeat scanning the head and track are aligned.

An audio head 67 is located adjacent to the output capstan. This head is in magnetically coupled relationship with a longitudinally disposed audio track **67*a* shown in FIG. 1. During record, the tape speed effect by the input and output capstans is equal. In order to insure that a constant velocity can be maintained by the tape while travelling past the audio head 67 during playback, the input capstan speed imparted to the tape by assembly 30 is made larger than the longitudinal speed imparted to the tape by the output capstan assembly. In order to prevent the accumulation adjacent the output capstan assembly, cavity 43 is employed in which the tape is fed prior to reaching the output capstan. A detector is employed in the cavity 43 which provides an output indicating that a predetermined amount of tape is present in this cavity. In response to this indication, the tape is held in the fixed or stop position so that the video head again traverses a video track (one video frame) which it had previously reproduced. Thus, a video frame will be repeated once or possibly twice in order to remove tape from the cavity 43** since only one or two video frames are repeated. This repetition is not discernible to the human eye. Thus, sufficient tape is always available at the output capstan to insure a constant speed of tape past the audio head.

DETAILED DESCRIPTION

The drum assembly 10 as shown in FIG. 1 includes the cylindrical drum 10*a* having fixedly mounted on the periphery thereof a magnetic recording and reproducing head 11. The head 11 is positioned midway between the upper and lower surface of and movable with the drum 10*a*. The magnetic transducer 11 is connected through leads 13 to a double pole, double throw switch 71 so that in one position, the head will be connected to a source of frequency modulation video signal originating from a conventional television camera 72 including a vidicon tube and a control unit for the vidicon tube. It will be understood that other sources could be utilized. In the other position, the switch 71 in the reproduction mode connects the transducer 11 through an FM demodulator to the television monitor 73 for reproducing video signals from the tape 20.

Figure 2:
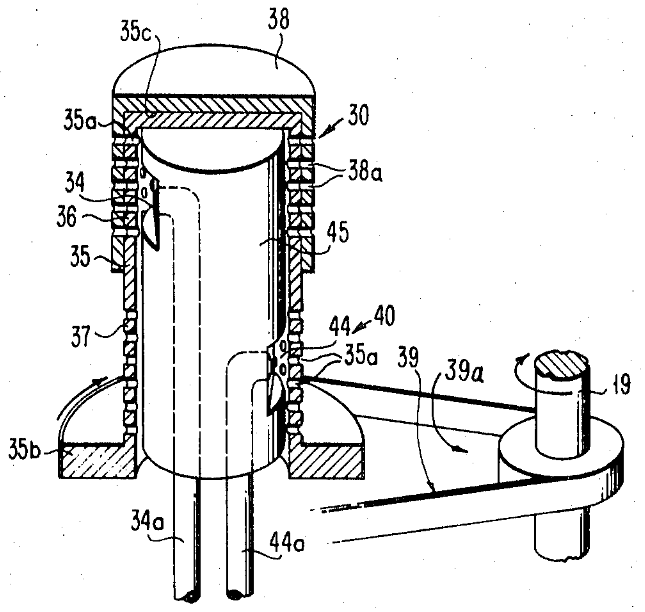
FIG. 2 is an isometric view partially in cross section of the vacuum capstan employed in an embodiment of the invention.

The tape is taken from the supply reel R1 (FIGS. 3—6) and threaded past a rotatable bearing 31 of the capstan assembly 30. The capstan assembly 30 includes as shown in FIGS. 1 and 2, a section 36 of tubular member 35 that rotates continually. The member 35 includes an upper section 36 and a lower section 37. The drive illustrated includes a belt 39 encircling a pulley 39*a* on a driven rotating shaft 19 that continually drives a flange 35*b* of member 35. Shaft 19 is continually driven by motor unit 60*b*. At the other end of member 35 is an integral circular end wall 35*c* that rotatably rests on a fixed cylindrical member 45. A cylindrical member 45 has an input vacuum cavity 34 and an output vacuum cavity 44. Completely around sections 36 and 37 is a plurality of apertures 35*a* that continually communicate with cavities 34 and 44 during rotation of member 35. When it is desired to have the input capstan drive of the tape, a vacuum is applied to vacuum cavity 34 through passage 34*a*. When it is desired to have an output capstan drive of the tape, a vacuum is applied to cavity 44 through passage 44*a*.

Figure 3:
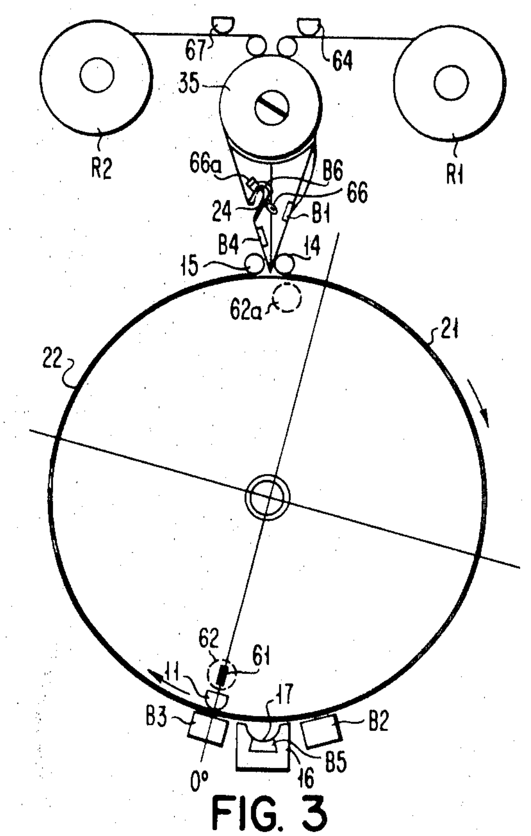
FIGS. 3—6 illustrate the relative position of the recording head and the magnetic recording tape during the operation of the embodiment of the invention illustrated in FIG. 1.

In addition, capstan assembly 30 includes an upper pie-shaped support member 32 having a vacuum brake B1, shown in FIGS. 1 and 3. As shown in FIGS. 1 and 3, the tape 20 is threaded past the surface of the pie-shaped member 32 and hence past brake B1. Another rotatable bearing 14 is positioned adjacent to drum 10*a* and the pie-shaped member 32. The tape is threaded between bearing 14 and drum 10*a* resulting in the tape always being positioned near the brake B1. The tape is then helically wound about the drum 10*a* starting at the top near bearing 14, around the drum 10*a*, and in contact with a lower rotatable bearing 15 similar to bearing 14.

The output capstan assembly 40 includes in addition to the section 37 and a vacuum capstan cavity 44, a lower pie-shaped member 42 also having a vacuum brake B4 at the outside thereof and for operative contact with the tape 20. The tape as stated above is threaded between the rotatable bearing 15 and the side of the lower pie-shaped member 42. It is then threaded past as shown in FIG. 3 and FIG. 1, tubular member 35 (section 37) near the vacuum cavity 44 and past the rotatable bearing 41. Thus, it can be seen that rotatable bearing 31 and rotatable bearing 14 maintain the incoming tape in close contact with the upper portion 36 of tubular member 35 as well as the upper brake B1. Likewise, the rotatable bearings 15 and 41 keep the outgoing tape in close contact with lower brake B4 as well as the lower portion 37 of tubular member 35. The tape is then threaded past bearing 41, an audio recording and reproducing head 67 and then to the takeup reel R2.

The supply reel R1 and takeup reel R2 are driven by a suitable motor (not shown) or other conventional means employed to prevent tape slack. Consequently, tape 20 only moves past the input capstan when there is a vacuum in cavity 34.

The pie-shaped member 42 also includes a cavity 43 for tape slack. At the bottom of this cavity 43 is a vacuum brake B6. Within the cavity 43 is a light source 66*a* which is aligned with a photodetector 66. Consequently, the photodetector 66 provides an output indication when a predetermined amount of tape is present within the cavity 43.

Diametrically opposite to the capstan assembly 30 and 40 is an assembly 16 which forms therein a cavity 17. At the bottom of this cavity or at the end of this cavity is a vacuum brake B5. As shown in FIG. 3, this cavity 17 will accommodate a slack portion 23 of tape 20 and will be held therein by actuating the brake B5. When slack occurs at the output end of the tape, brake B6 will force a slack loop 24 into the cavity 43.

Equally spaced on either side of support assembly 16 are two additional vacuum brakes B2 and B3.

As stated above, the drum 10*a* is fixedly mounted on the shaft 12. Also fixed on the shaft 12 is a pneumatic or vacuum-timing means 80 having a timing plate 81 which is fixedly secured to the shaft 12. A motor 60*a* of motor drive 60 is employed to rotate shaft 12 which also rotates plate 81 as well as the drum 10*a* and the shaft 12 drive a vacuum pump assembly 50.

The vacuum pump assembly 50 includes a vacuum pump 51 with a vacuum conduit 52 being connected to a circular housing 53 and chamber 54 which is fixed with respect to the support S. The housing 53 provides a vacuum chamber 54 having seven radially disposed holes 55. The vacuum achieved in vacuum pump 51 is thereby communicated to the vacuum chamber 54 and thence to the holes 55. A subsupport S1 includes seven vacuum passages mounted therein. This subsupport assembly S1 is fixedly mounted with respect to the main support S. Between the subsupport assembly S1 and the holes 55 of the circular housing 53 is a timing plate 81 having apertures than can be aligned to provide communication between the apertures 55 and the seven vacuum passages.

As stated above, within the subsupport S1 is a plurality of vacuum passages which are connected to the brakes B1 through B6 and the output vacuum capstan 44. More specifically, passage B1*a* is connected to brake B1 to supply, in proper sequence or timing, a vacuum to brake B1. Passage B2*a* is similarly connected to the brake B2 to actuate that brake in proper sequence. Likewise, and for the same reasons, passage B3*a* is connected to brake B3; vacuum passage B4*a* is connected to brake B4; vacuum passage B5*a* is connected to brake B5; vacuum passage B6*a* is connected to brake B6. Vacuum passage 44*a* is connected to the output capstan cavity 44. Thus, to effect the proper incrementing movement of the tape as described above, the timing plate 81 will have holes or slots 82 therein to provide vacuum from the chamber 54 to selected ones of the brakes B1—B6 and to the vacuum capstan 44 in proper sequence and timing. It will be understood that the timing will be identical for each when recording or reproducing in a "run" mode. It will be understood that the vacuum passages, discussed above, are connected to vacuum chambers in the respective brakes. These chambers have holes therein to all pressure to equal that of the atmosphere so as to enable the pressure to be selectively applied to the tape 20 between atmospheric and lower pressure from the vacuum pump.

FIG. 1 illustrates the timing plate 81 with the communicating holes 82 therein. The placement of these holes is in accordance with the timing chart in FIG. 7. Whether or not there is communication between one of the brakes or the output capstan and the vacuum chamber 54 through plate 81 is a function of the position of the head 11 illustrated in FIGS. 3—6 as in the 0°, 90°, 180° and 270°, respectively. If in any one position of this angular positioning of the head 11, the brake or the output capstan is indicated as being on, there will be a hole 82 in plate 81 communicating between the corresponding brake passage in the subassembly S1 and the vacuum chamber 54, when the head 11 is in that predetermined position. For example, the output capstan cavity 44 is always driving or on, therefore, in FIG. 1, there will always be a hole 82 that communicates between passages 44A and the vacuum chamber 54 by way of holes 55.

It will be understood that the cylinder 35 rotates clockwise as shown in FIG. 3 to advance the tape in the direction indicated around the drum 10*a*.

The motor-driving means 60 includes the motor 60*a*. In addition as shown in FIGS. 3—6, a photo indicia such as a light source 61 is located on the top surface of the drum 10*a* in a radially disposed plane passing through the center of the magnetic head 11. A photocell 62 is mounted, as shown in FIGS. 1 and 3, in a fixed position directly above the light source 61 when this photo indicator and head 11 are at 0° as shown in FIG. 3. In this position, the center of head 11 is opposite the center of the brake B3. The tape 20 includes as shown in FIG. 1, magnetic track-indicating means 63*a* which are spaced 0.3 inch apart to indicate a desired track spacing on the tape 20. Coupled to and adjacent these track sync marks 63*a* on the upper portion of tape 20, is a magnetic head 64.

It will be understood that when the indicia light source 61 passes the photodetector 62 (such as in FIG. 3), a pulse will appear at the output of the photodetector 62. Likewise, when a magnetic mark 63 (FIG. 1) passes the head 64, a pulse will appear at the output of the magnetic head 64.

The photodetector 62 and the magnetic head 64 are connected to a servo phase detector 65. Detector 65 detects any phase difference between the pulses from detector 62 and the magnetic head 64. Any difference in phase between these pulses will produce an analogue error signal such as is done in a horizontal AFC circuit for a television set. The output of 65 will speed up or slow down the motor unit 69 (which drives capstan cylinder 35) until the pulses from the photodetector 62 and the magnetic head 64 occur at the same instant. This servomotor control will continue throughout any recording or reproducing on the tape recorder. By varying the speed of cylinder 35, this varies the slack before brake B1 that is incremented to cavity 17.

Figure 8:
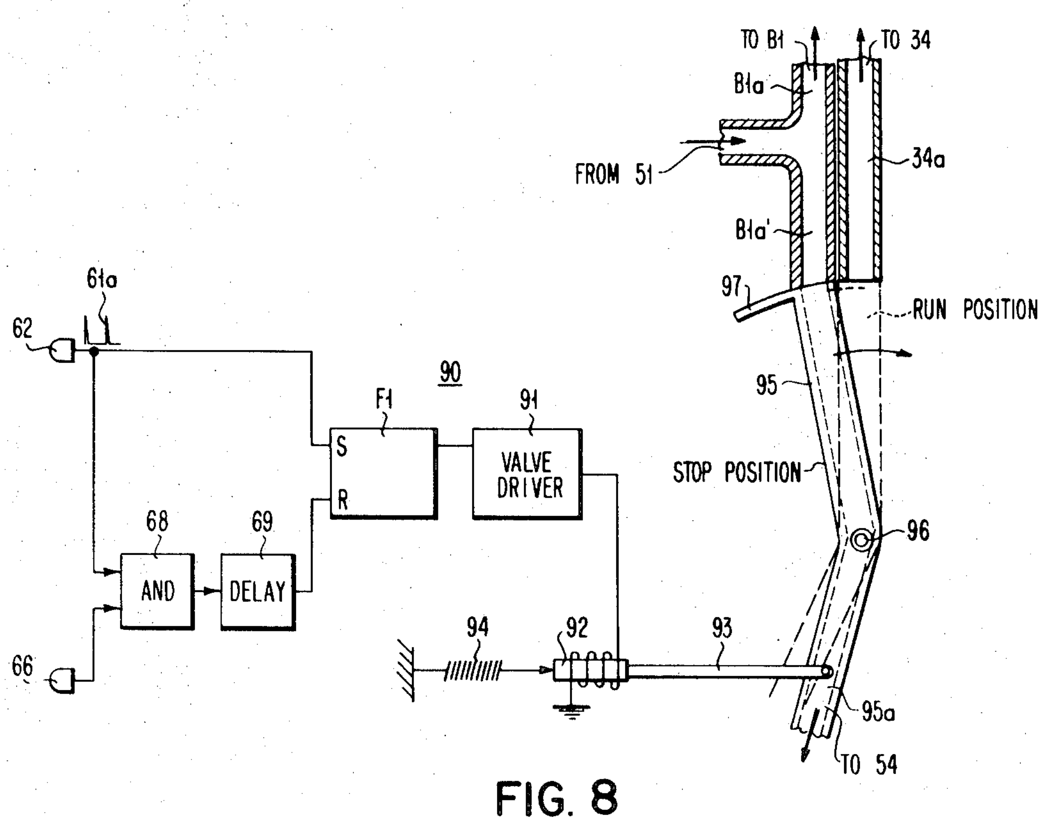
FIG. 8 illustrates a control circuit employed with an embodiment of the invention.
Figure 7:
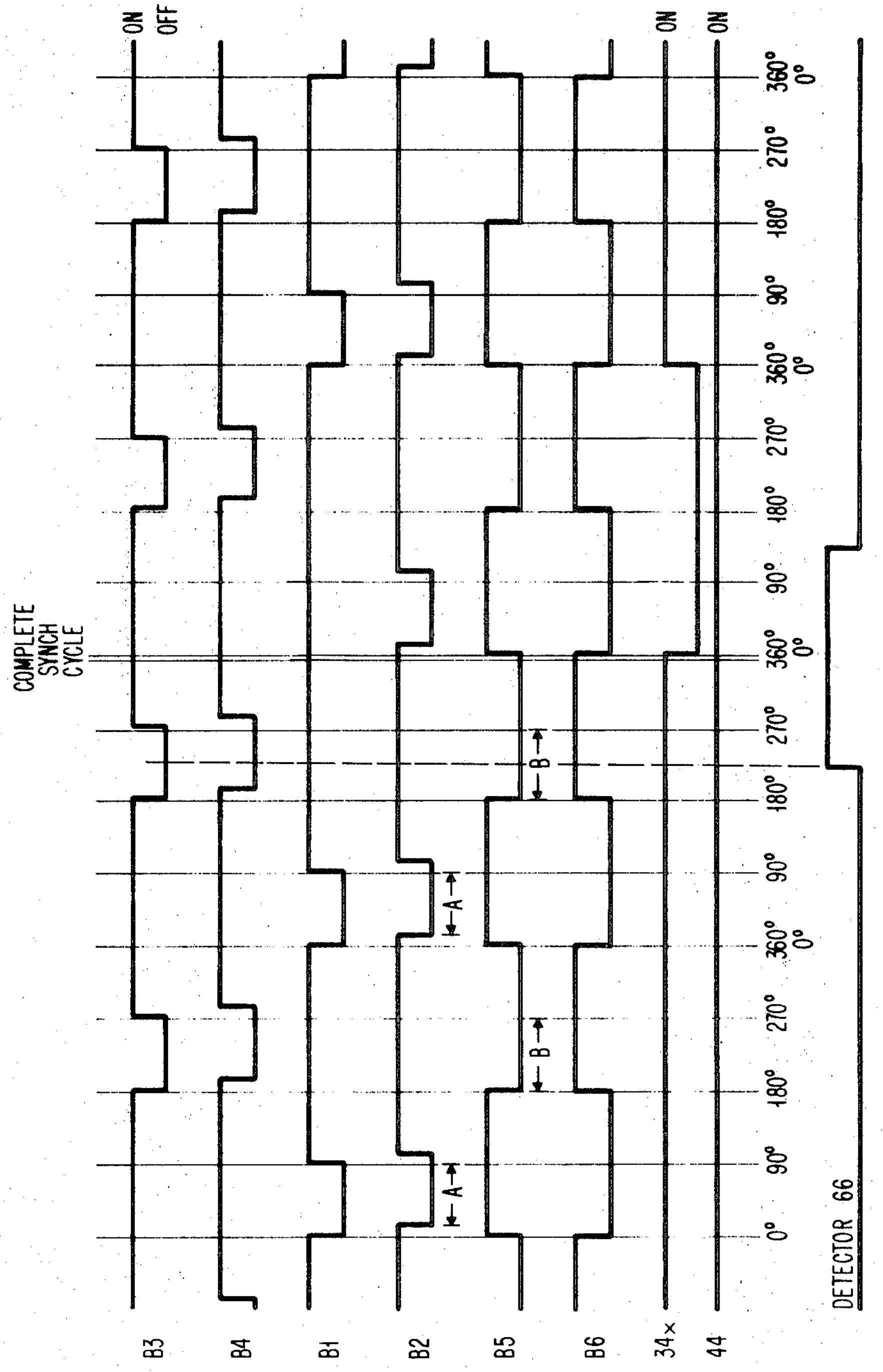
FIG. 7 illustrates a vacuum-timing diagram useful in explaining the embodiment of the invention illustrated in FIG. 1.

The timing plate 81 does not control the vacuum to the input capstan cavity 34 but rather the input capstan cavity 34 is controlled for single frame or stop frame use by a control system 90 shown in FIG. 8. Normally, in regular or run position or incrementing position of the recorder, the vacuum to capstan cavity 34 remains on continually, similarly as the output capstan 44. During playback, detector 62 supplies pulses 61*a* to the S input of RS flip-flop F1. When a predetermined amount of tape accumulates in cavity 43, detector 66 is actuated to supply one input to an AND gate 68. Also connected to this AND gate 68 is a photodetector 62 to which pulses 61*a* are applied. Photodetector 62 is also connected to the S input of flip-flop F1. The output of AND gate 68 is connected to delay 69 and thence to the R input of flip-flop F1. When the photodetector 66 is not activated by tape in the cavity 43, the pulses 61*a* will maintain the flip-flop F1 set so that the tube 95 will remain in the run position as shown in dotted lines. When tape passes between photodetector 66 and light source 66*a*, the detector 66 will be effective to apply a one to AND gate 68. Consequently, as illustrated in FIG. 7 at the next occurrence of a pulse 61*a* from detector 62, there will be a one output from AND gate 68 which passes through delay 69 to reset flip-flop F1. The delay 69 is sufficient to insure that the same pulse 61*a* does not reset and then shortly thereafter set flip-flop F1. Consequently, with a one output from AND gate 68, the valve driver 91 will effect placing tube 95 in the stop or solid line position. More specifically, the solenoid will not be actuated and some suitable spring 94 will pull arm 93 to the right to thereby rotate arm 95 counterclockwise about pivot 96 into the stop position shown in solid lines in FIG. 8.

One end (95*a*) of tubular arm 95 is connected directly to vacuum chamber 54. When arm 95 is in the run position, shown in dotted lines in FIG. 8, it will supply a vacuum to cavity 34 by way of passage 34*a*. Also in this position, arm 97 will seal off a passage B1*a*′ that communicates with passage B1*a*. The purpose of this is to allow a vacuum to be applied to brake B1 (via passage B1*a*) in run position.

In stop position (shown in solid lines) a vacuum is applied through passage B1*a*′, passage B1*a* to brake B1. However, the vacuum to cavity 34 (via passage 34*a*) is discontinued.

A photodetector 62*a* is employed. This detector is positioned, as shown in dotted lines in FIG. 3, to provide an output pulse (from source 61) when head 11 begins magnetic coupling with an oblique video track. This produces a pulse that is applied to camera unit 72 to effect readout of one video frame (2 fields). The drum 10*a* rotates at the conventional video frame rate of 30 revolutions per second. Consequently, each oblique video track contains one video frame (two video fields).

OPERATION

The timing diagrams in FIG. 7 illustrate the effect of the timing plate 81 and chamber 54 to activate the vacuum brakes B1, B2, B3, B4, B5 and B6 as well as the cavities 34 and 44. If the level of the timing diagram is up or on, this is to indicate that during this period of rotation or position of the head 11, the corresponding brake or capstan has a vacuum being applied thereto. The timing shown for the input and output capstan cavities 34 and 44 indicate that they are always on in the normal run condition.

FIGS. 3—6 as stated above illustrate four positions indicated by 0°, 90°, 180° and 270° of the head 11. As stated above, the 0° position is the position of the head 11 when it is radially disposed with the center of the brake B5 as shown in FIG. 3. It will be understood that the head 11 is located midway between the upper and lower surfaces of the drum 10*a*.

Initially, the tape can be threaded to place the tape in the position shown in FIG. 3 with the oxide near the drum and the head 11 near the 0° position. More specifically, the tape is threaded off reel R1, past head 64, past roller 31, tubular member 35, brake B1, roller 14 (with some slack tape placed between roller 31 and roller 14) around the drum past brake B2, B5, B3, roller 15, brake B4, roller 41 with some slack placed in the cavity 43. The head is placed slightly before 0° and the motor 60*a* started so as to provide sufficient vacuum when the head reaches for 0°. At 0°, brake B1 is deactivated and during movement of the head between 0° and 90°, the brake B2 is also deactivated with the cavity brake B5 being actuated. Thus, during movement of the head between 0° and 90°, the semicircular portion of the tape 21 is being pulled into cavity 17 by the vacuum in brake B5. This creates a slack loop 23. Thus, portion 21 of the tape 20 is being incremented forward during this period. Thus, the slack between rollers 31 and 14 is the distance the tape is incremented (into cavity 17). During movement of the head between 0° and 90° as shown in FIG. 7, however, brakes B3 and B4 are on so that the other portion 22 of the tape 20 is held stationary while the head 11 scans helically from 0° position to 90° position. In addition, during this period, the cavity brake B6 is off and thus the capstan 44 is drawing tape out of the cavity 43, thus decreasing the size of the loop 24 in cavity 43.

Figure 4:
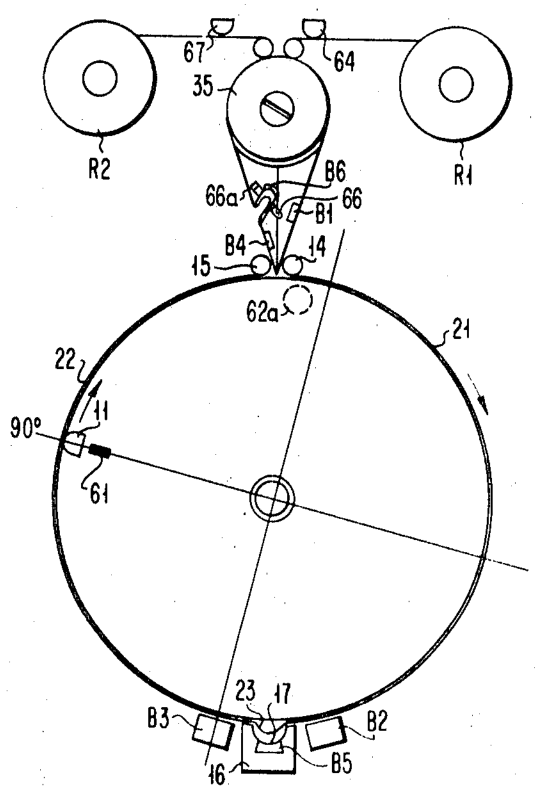

Thus, when the head 11 reaches the position shown as 90° in FIG. 4, the cavity 17 is filled with tape and the cavity 43 is empty or substantially empty of tape. When the head reaches 90° position, the brake B1 is actuated and shortly thereafter the brake B2 is actuated to hold the tape portion 21 stationary with respect to the drum and the head.

Figure 5:
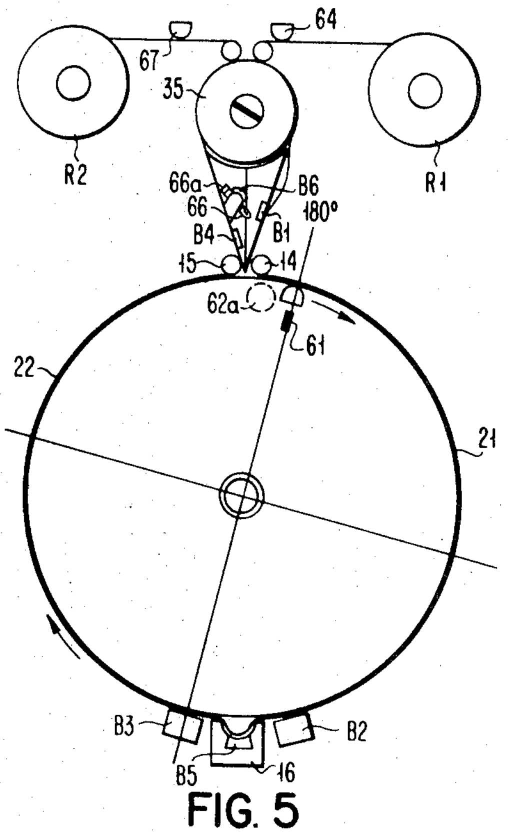
Figure 6:
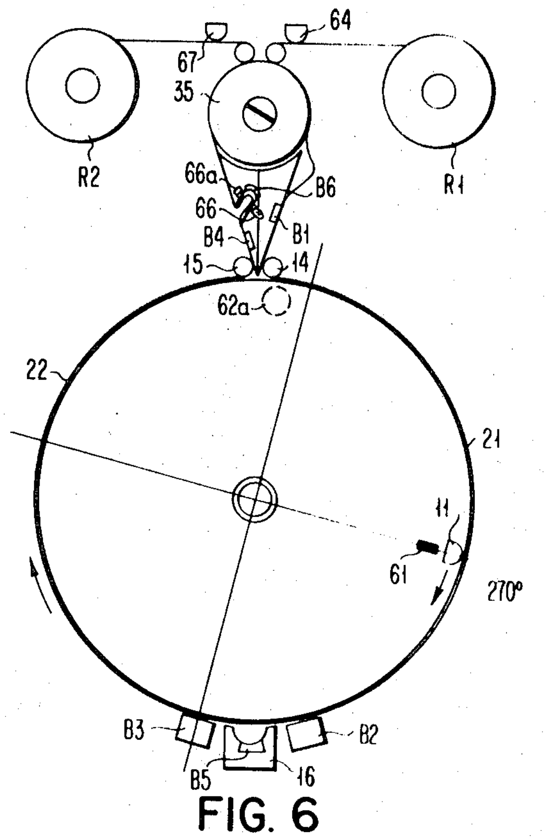

As the head moves from the 90° position shown in FIG. 4 to the 180° position shown in FIG. 4, both portions of the tape 21 and 22 are held stationary by the brakes B1, B2, B3, and B4 being actuated with a vacuum being applied to these brakes. Also, during this period, the cavity brake B5 is actuated so as to maintain the tape securely in cavity 17. During this period since the brake B1 is actuated, a loop will develop just prior to the brake B1 as shown in FIG. 5. When the head 11 reaches 180° position as shown in FIG. 5, the cavity 43 will have substantially no tape therein since B6 is deactivated from 0° to 180°. At this time (180°), the cavity brake B6 will be activated and brakes B1 and B2 will remain activated. Brake B5 in cavity 17 will be deactivated to enable incrementing or forwarding of the tape portion 22 during the next 90° rotation of the head 11. At the 180° position of head 11 and shortly thereafter, brakes B3 and B4 respectively will be deactivated. Brake B4 will be deactivated so as to commence movement of tape from cavity 17 to cavity 43 (the brake B6 being activated during this period). Thus, during the movement of the head from 180° to 270°, brakes B1 and B2 are activated so as to keep the portion 21 fixed. However, during a substantial portion of this period, both brakes B3 and B4 are deactivated so that movement is affected longitudinally of the portion 22 thereby emptying the tape from the cavity 17 and applying tape into the cavity 43. When the head reaches 270°, cavity 43 is substantially filled and the portion 21 is being held fixed by brakes B1 and B2. In addition, cavity 17 is empty. When the head reaches 270°, brake B3 is actuated and shortly thereafter brake B4 is actuated. Thus, commencing approximately at 270° head position, the portion 22 is fixed. Therefore, during the period in which the head 11 moves to 270° to 360°, portion 21 is held fixed by brakes B1 and B2 and portion 22 is being held still by brakes B3 and B4. As head 11 reaches the 0° position, the cycle repeats itself as shown in the timing diagram in FIG. 7.

Thus, it is seen that the tape is moved from one cavity to another during roughly 90° of rotation of the head while the head is scanning a portion of the tape that is fixed. Subsequently while the head is scanning the other portion of the tape, and during a similar 90° period, the tape is moved from one cavity to another cavity. Thus, while one cavity is being loaded or filled, the other cavity (17 or 43) during this same period is being emptied. During period A shown in FIG. 7, while the head 11 is rotating from 0° to 90°, cavity 17 is being filled by tape portion 21 being moved into that cavity and during this same period, cavity 43 is being unloaded or spilled while the portion 22 is being held fixed. During the period marked B in the timing diagram in FIG. 7, cavity 43 is being filled, by the spilling or unloading of the tape from cavity 17 as the head 11 moves from 180° to substantially 270° during which time the portion 21 is being held fixed by brakes B1 and B2.

Each incrementing of the tape, for example, slack adjacent brake 1 to cavity 17 and from cavity 17 to cavity 43 increments the tape a predetermined distance and preferably this distance is .3 inch to define the distance between tracks. Thus, it is seen that the track spacing is determined by the slack created adjacent brake B1 by the input capstan. It will be understood that since the tape is helically disposed about drum 10*a* that the tracks will be angularly disposed with respect to the tape 20. Thus, as the head is positioned at approximately the 180° position, it will start the lower portion on the track which will end as the head reaches the position adjacent roller 15. Another track will start when the head 11 again reaches approximately the 180° position. The spacing between tracks, as stated above, is desired to .3 inch which is determined by the speed of the input capstan which is chosen to feed .3 inch of tape per revolution of drum 10*a*. Each oblique video track contains one complete video frame or two video fields to be interlaced.

Since this same movement will generally apply during record or playback as described above and the cycles will occur in the same sequence. The one difference is that the video signal will be applied to the head 11 by way of, for example, a television camera 72 in a record mode (through an FM modulator) whereas in a playback mode, the head 11 will pick up the signal on tape 20 so as to provide video information for a TV monitor 73 (through an FM demodulator). Thus, in playback, if it is decided to repeat a picture, by not incrementing or longitudinally moving the tape to the next track, the head 11 will remain in the identical position with the recorded track as with the original track. This is contrary to a conventional tape recorder wherein the tape which is helically wound about the drum is continuously moving so that when the tape is held fixed with respect to the drum on a stop action replay, the head 11 will not be aligned throughout the travel of the tape with the track. In addition in record, detector 66 will be disconnected. Further the tape speeds at input and output will be equal.

The magnetic sync marks 63 could be recorded various ways. One method for example, would be to operatively connect detector 62 to head 64, during record, to record a sync mark every time the head 11 passes zero. In such a method the servo 65 would not be connected to motor 60*b* during record, but only in playback. Motor 60*b*, however, would drive cylinder 35 at a constant speed.

Alternatively another preferred method would be to produce marks 63 during record by connecting detector 62*a* to head 64 as well as camera 72 and disconnecting servo 65 from motor unit 60*b*. 60*b*, however, would drive 35 at a constant speed. In playback, therefore, detector 62*a* would be connected to servo 65 rather than detector 62. In addition in such playback, 65 would be connected to motor unit 60*b*. Thus as stated above during playback, servo detector 65 varies the speed of the input capstan (and therefore the loop near brake B1) so that the pulses of the two input pulse trains to detector 65 are in coincidence. It will be understood that varying the loop above brake B1 will vary the distance the tape is incremented above the drum 10*a*. This therefore varies the position of pulses 63*a* with respect to head 64.

The magnetic marks 63 could also be prerecorded before recording.

During recording, the cylindrical cap 38 will not be utilized so that the input and output capstan speeds will be equal. In addition detector 66 will be disconnected. The head 11 will produce the video tracks and the head 67 will produce the linear audio track from an audio source (not shown). The tape 20 will be threaded sufficiently high on the output and near roller 15 so that the video track will end slightly below the upper edge of tape 20. This will produce space on the upper edge of tape 20 for a linear audio track 67*a* and outwardly thereof marks 63*a*. The video recording will be as mentioned above without the cylindrical cap 38 and will be accomplished as described above and in the above-identified patent application.

In playback, the cap 39 has apertures 38*a* which are aligned with apertures 35*a* and are fixed in this position by some suitable means such as a tongue and groove (not shown). In playback, cap 38 is placed over cylinder 35 and covers only input capstan section 36 with holes 38*a* aligned with holes or apertures 35*a* in section 36. In playback, the tape 20 is threaded or placed the same as for record with respect to drum 10*a*, bearings 31, 14, 15, 41, section 37, etc. except that it is threaded past cap 38. Thus, in playback, cap 38 acts as the input capstan. Roller 31 is preferably spring pressed toward the cylinder 35 and movable outwardly to accommodate cap 38. By utilizing cap 38, the input capstan speed is made faster than the output capstan speed (i.e. 10 percent faster). As a result, the cavity 43 will periodically be filled to effect a change of output from detector 66. When the cavity is not filled as for as detector 66, arm 95 will be in the dotted line run position as described above. When the cavity 43 is filled up to detector 66 and light 66*a*, however, a one will be applied to gate 68 from 66 so that a one output will result from AND gate 68 upon occurrence of the next pulse 61*a* from detector 62. Due to delay 69, this one output will reach flip-flop F1 shortly after this pulse 61*a* reaches the S input of flip-flop F1 so that the flip-flop will be reset at approximately 0° position of the head. This results in the arm 95 being rotated counterclockwise into the solid line or stop position. As a result, for one complete rotation of the head 11, a complete video frame will be repeated while the cavity 43 tends to empty itself of tape. After this 360° rotation without one output from detector 66 (due to the tape being emptied from cavity 43), the next occurrence of a pulse 61*a* (at 0° position) will set flip-flop F1 resulting in a one being applied to the valve drive 91 to provide current to the solenoid 92 to thereby position arm 95 in the run or dotted line position.

It will be noted, as shown in FIGS. 7 and 8, that while in the stop position (for 360°) the input capstan cavity 34 will not have a vacuum. In addition, brake B1 will be on for 360° and will be of sufficient force to prevent tape 20 from advance beyond its position in FIG. 1 (or 0° position). As a result, one video track (one video frame) is repeated while audio continues to playback from head 67.

Thus, it is seen that periodically a complete video frame will be repeated during which time cavity 43 tends to empty itself of tape during playback. Since a single repeat periodically of a video frame is not discernible, the video reproduction is virtually the same to the human eye. Due to the lower speed of the output capstan and the lower linear speed of the tape at the output and the control of the cavity 43, constant speed and high quality audio are achieved.

It will be understood that when tapes pass between light 66*a* and detector 66, the output of detector 66 will actually go down. Thus, as a practical matter, some type of DC inverter or its equivalent, would be connected between detector 66 and AND gate 68. This would enable 66 to provide a one to gate 68 when the cavity is filled.

It will be noted that "stop" playback can be effected manually merely by placing an object between light 66*a* and detector 66. This will enable selective stop action viewing.

It will be understood that it is not necessary to utilize cap 38 and detector 66 upon playback to provide good reproduction. However, when cap 38 and detector 66 are employed in playback, this insures a constant tape speed past audio head 67 to insure a high quality of audio reproduction. It will be understood that detector 66 could be used in playback without using cap 38. In such a case, detector 66 could be actuated manually to give high quality stop frame or stop motion video reproduction. In such stop frame a single video frame is repeated with head 11 in exact alignment with the video track contrary to present recorders. Such stop frame is accomplished by manually placing an object between 66 and 66*a*.

As stated above, each video track contains one complete composite video frame (two fields to be interlaced). This is done during recording by actuating readout of the vidicon tube (in unit 72) by a pulse from 62*a*. This pulse occurs when head 11 begins scanning a video track. Unit 72 provides a composite video output (including horizontal and vertical sync with the video). The composite readout from unit 72 is at the conventional video rate of 30 frames/sec. with each frame containing two fields to be interleaved. The motor 60*a* rotates the drum 10*a* at 30 revolutions/sec. Consequently, each track contains one complete video frame.

It will be understood that during record, head 67 will record audio on track 67*a* from any suitable audio source (not shown). In playback, head 67 will be switched from this source to some suitable audio reproduction system (amplifier and speaker).

It will be understood that vertical tape edge guides (not shown) are normally employed to maintain the tape vertically in the threshold position shown in FIG. 1. These guides for example could be mounted above and below the tape near bearings 14, 15, 31 and 41 and near heads 64 and 67.

While the invention has been particularly shown and described with reference to a preferred embodiment thereof, it will be understood by those skilled in the art that various changes in form and details may be made therein without departing from the spirit and scope of the invention.

I claim:

1. Apparatus for recording and reproducing video signals comprising:
- a rotary transducer rotatable in a predetermined plane which intersects a helically disposed recording tape and at an angle thereto;
- actuating means rotating said transducer in said plane adjacent said tape;
- a first braking assembly fixedly positioning a first portion of said tape;
- advancing means effecting movement of a second portion of said tape while said first portion is fixed;
- a second braking assembly fixedly positioning said second portion of said tape after said movement; and
- said actuating means timed to move said transducer head adjacent said first portion while said first portion is fixed and adjacent said second portion while said second portion is fixed and after said movement.

2. A magnetic recording and reproducing apparatus for recording and reproducing composite video signals on a recording medium comprising:
- a transducer head;
- actuating means moving said transducer head in magnetically coupled relationship with a first track angularly disposed on said recording medium while said recording medium is fixed;
- means moving said recording medium after said transducer head has traversed said first track from a supply area on one side of said head to a cavity in a takeup area on the opposite side of said head;
- said actuating means subsequently moving said transducer head in a magnetically coupled relationship with a second track angularly disposed on said recording medium while said recording medium is fixed; and
- detecting means responsive to said recording medium within said cavity to effect repeat movement of said head in magnetically coupled relationship with said second track while said recording medium is fixed.

3. A magnetic recording and reproducing apparatus as set forth in claim 2 wherein said detecting means is responsive to movement of said recording medium beyond a predetermined distance into said cavity to effect repeat movement of said head in magnetically coupled relationship with said second track while said medium is fixed.

4. A magnetic recording and reproducing apparatus as set forth in claim 2 including a second transducer head within said takeup area and in magnetically coupled relationship with a track longitudinally disposed on said record medium and said cavity being located between said transducer head and said second transducer head.

5. A magnetic recording and reproducing apparatus as set forth in claim 2 wherein said angularly disposed tracks are adapted to store video information and said longitudinally disposed track is adapted to store audio information.

6. Magnetic recording and reproducing apparatus, comprising:
- an elongated magnetic strip record medium;
- an electromagnetic transducer arranged for movement at a predetermined angle with respect to the longitudinal axis of said magnetic strip record medium for magnetic transfer therebetween;
- means for holding said strip record medium fixed for traverse of said electromagnetic transducer in a given path;
- means for incrementing said strip record medium in two successive arcuate portions with but one portion being transported at a time to a position at which said holding means is effective for traverse of said electromagnetic transducer in a path parallel to said given path; and
- said strip record means remaining in the same angular orientation in the successive transporting positions relative to said holding means and said incrementing means and said electromagnetic transducer throughout all operations.

7. Magnetic recording and reproducing apparatus as defined in claim 6 and wherein:
- said electromagnetic transducer is arranged to revolve about a central axis; and
- said strip record medium is maintained in an arc about said axis.

8. Magnetic recording and reproducing apparatus as defined in claim 7 and wherein said strip record medium is incremented over substantially half of said arc while the other half of said medium is held in place.

9. Magnetic recording and reproducing apparatus as defined in claim 8 and wherein said strip record medium is incremented as said electromagnetic transducer is traversing said half of said arc over which said medium is held in place.

10. Magnetic recording and reproducing apparatus as defined in claim 8 and wherein said incrementing creates a slack portion between the portions of said tape arranged over said halves of said arc.

11. Magnetic recording and reproducing apparatus as defined in claim 10 and wherein control of the incrementing is exercised in creating said slack portion.

12. Magnetic recording and reproducing apparatus as defined in claim 10 and wherein another electromagnetic transducer is arranged for movement in the same path as the first said transducer.